(12) United States Patent
Chang et al.

(10) Patent No.: US 7,026,422 B2
(45) Date of Patent: Apr. 11, 2006

(54) HYDROLYTIC CONDENSATION COATING COMPOSITION, HARD COAT FILM AND METHOD OF PREPARING THE SAME

(75) Inventors: Yun-Han Chang, Chu Pei (TW); Tsai-An Yu, Chu Tung Chen (TW); Wen-Chih Lin, Hsinchu (TW)

(73) Assignee: Far Eastern Textile Ltd., Taipei (TW)

( * ) Notice: Subject to any disclaimer, the term of this patent is extended or adjusted under 35 U.S.C. 154(b) by 0 days.

(21) Appl. No.: 10/387,721

(22) Filed: Mar. 13, 2003

(65) Prior Publication Data

US 2004/0091725 A1 May 13, 2004

(30) Foreign Application Priority Data

Nov. 8, 2002 (TW) ............................... 91132958 A

(51) Int. Cl.
*C08G 77/08* (2006.01)
(52) U.S. Cl. .................... 528/13; 528/38; 528/27; 523/425
(58) Field of Classification Search ............... 523/402, 523/425, 435; 525/523; 528/17, 27, 91, 528/119
See application file for complete search history.

(56) References Cited

U.S. PATENT DOCUMENTS

| | | | |
|---|---|---|---|
| 2,689,843 A * | 9/1954 | Ludington | 528/13 |
| 4,339,565 A * | 7/1982 | Tomoda | 528/27 |
| 4,609,692 A * | 9/1986 | Huybrechts et al. | 523/439 |
| 5,998,013 A | 12/1999 | Shoshi et al. | |
| 6,319,594 B1 | 11/2001 | Suzuki et al. | |
| 6,329,041 B1 | 12/2001 | Tsuchiya et al. | |
| 6,376,060 B1 | 4/2002 | Yoshihara et al. | |
| 2002/0028312 A1 | 3/2002 | Onozawa et al. | |
| 2002/0028328 A1 | 3/2002 | Onozawa et al. | |

FOREIGN PATENT DOCUMENTS

JP    56 125465    * 10/1981

OTHER PUBLICATIONS

Lee and Neville, Handbook of Epoxy Resins, McFraw-Hill, 1967, p. 5-15.*
Perez in Bruins(ed), "Epoxy Resin Technology", John Wiley, 1968, pp. 76-77.*

* cited by examiner

*Primary Examiner*—Margaret G. Moore
(74) *Attorney, Agent, or Firm*—Merchant & Gould P.C.

(57) ABSTRACT

A hydrolytic condensation coating composition includes a silane, an epoxy resin, a hydrolytic condensation catalyst, and a solvent. The weight ratio of the epoxy resin to the silane is 1:0.4~6. The silane is reactable with the epoxy resin, and is hydrolyzable in the presence of the hydrolytic condensation catalyst to form a three-dimensional stereo-network structure. A hard coat film obtained by coating a plastic substrate with the coating composition, followed by thermo-curing, exhibits high transparency and hardness, and has excellent anti-scratch and chemical-resistant properties. The hard coat film is suitable for use as a surface protective film for displays, polarizers, touch panels, ITO conductive films, other optical elements, and the like.

8 Claims, No Drawings

HYDROLYTIC CONDENSATION COATING COMPOSITION, HARD COAT FILM AND METHOD OF PREPARING THE SAME

CROSS-REFERENCE TO RELATED APPLICATION

This application claims priority of Taiwanese application no. 091132958, filed on Nov. 8, 2002.

BACKGROUND OF THE INVENTION

1. Field of the Invention

The present invention relates to a hydrolytic condensation coating composition, a hard coat film formed from the coating composition, and a method for preparing the hard coat film, more particularly to an epoxy-resin-based coating composition that includes silane as a coupling agent, and a coat film with high transparency and hardness and obtained by coating a transparent plastic substrate with the coating composition, followed by a thermo-curing process.

2. Description of the Related Art

With the consideration of formability and reduction in weight, there is a trend to gradually replace glass products with plastic products. However, plastic products typically have surfaces which can be easily scratched. A hard coat film has been proposed heretofore for application to a surface of a plastic product so as to impart the product with enhanced anti-scratch and anti-abrasion characteristics. The hard coat film is typically obtained by coating a plastic substrate with a thermosetting resin or an ionizing radiation curing resin (such as UV hard resin).

U.S. Pat. No. 6,376,060B1 discloses a hard coat produced from a coating component containing one or more organic components having a polymerizable functional group and an inorganic filler, at least one of the organic components being free from a hydrogen bond-forming group. U.S. Patent Publication No. 2002/0028328A1 discloses an anti-glare hard coat film which comprises 100 parts by weight of (A) a resin cured by an ionizing radiation, 2~25 parts by weight of (B) silica particles having an average diameter of 0.5 to 5 μm, and 100~200 parts by weight of (C) fine particles having an average diameter of 1~60 nm. U.S. Pat. No. 6,329,041B1 discloses a hard coat film which comprises a plastic base film having a pencil hardness from 4 B to HB, a buffer layer composed of one or a plurality of layers with a total thickness of 3~50 μm formed on at least one side of the plastic base film, a hard coat layer (formed from an ionizing radiation curing resin) with a thickness of 3~15 μm and a pencil hardness from 3 H to 5 H, and an anti-reflection layer formed on the surface of the hard coat layer. U.S. Pat. No. 5,998,013 discloses an anti-glare hard coat film which comprises a plastic film and a hard coat layer coating the plastic film. The hard coat layer comprises 100 parts by weight of a cured product of a UV-curing resin and 1~30 parts by weight of agglomerates of colloidal silica particles formed with an amine compound. U.S. Pat. No. 6,319,594 B1 discloses a low-reflection anti-static hard coat film which comprises a transparent conductive layer, a hard coat film and a low-reflection layer formed in sequence on a transparent plastic base film. The hard coat film is formed from an ionizing radiation curing resin composition (optionally containing reactive organic silica compound).

Most of the aforementioned prior art utilize the ionizing radiation (such as UV) curing resin as a main component to form the hard coat film. As the material cost would be relatively high, the aforementioned hard coat films are not suitable for mass production.

U.S. Patent Publication No. 2002/0028312 A1 discloses a hard coat film comprising a silicone-based hard coat layer formed on one side of a multi-layered base which is composed of a plurality of the same or different resin films in a laminate. This kind of hard coat which includes silicone as a main component is relatively brittle. This is a drawback typical of inorganic material. This publication is incorporated herein by reference.

Accordingly, the conventional hard coat film formed either from UV radiation curing resin or from pure siloxane compound suffers from the drawback of higher costs of the UV curing resin material and the UV ionizing radiation equipment, or the drawback of insufficient hardness of the hard coat film, especially that formed from pure siloxane compound. As such, there is a need for a hard coat film that exhibits high transparency and high hardness and that can be produced from low cost materials through a relatively inexpensive method.

SUMMARY OF THE INVENTION

Therefore, the main object of the present invention is to provide an epoxy-resin-based hydrolytic condensation coating composition that includes silane as a coupling agent for forming a hard coat film with a three-dimensional stereo-network structure.

Another object of the present invention is to provide a hard coat film that includes a transparent plastic substrate coated with the hydrolytic condensation coating composition of this invention, and a method for preparing the hard coat film.

According to one aspect of the invention, a hydrolytic condensation coating composition comprises a silane, an epoxy resin, a hydrolytic condensation catalyst, and a solvent, wherein the weight ratio of the epoxy resin to the silane is 1:0.4~6, the silane being reactable with the epoxy resin and being hydrolyzable in the presence of the hydrolytic condensation catalyst to form a three-dimensional stereo-network structure.

Preferably, the silane is represented by the following formula(I):

$$Si(R_1)_1(R_2)_x(OR_3)_y \quad (I)$$

wherein x is an integer ranging from 0~2, y is an integer ranging from 1~3, and x+y=3;

wherein $R_1$ is selected from the group consisting of C1~C4 alkyl groups substituted by an amino group, a hydroxy group, a carboxyl group or a halide, and an epoxide group;

wherein each $R_2$ is independently selected from the group consisting of C1~C4 alkyl groups substituted by an amino group, a hydroxy group, a carboxyl group or a halide, and non-substituted C1~C4 alkyl groups; and wherein each $R_3$ is independently selected from the group consisting of C1~C4 alkyl groups.

In a preferred embodiment, $R_1$ is —$(CH_2)_3NH(CH_2)_2NH_2$, $R_3$ is —$CH_3$, x is zero, and y is 3.

In another preferred embodiment, $R_1$ is —$(CH_2)_3NH_2$, $R_3$ is —$C_2H_5$, x is zero, and y is 3.

Preferably, the weight ratio of the epoxy resin to the silane is 1:0.75~2.5.

Preferably, the epoxy resin is a thermosetting resin with a terminal epoxy group. In the preferred embodiment, the epoxy resin is represented by the following formula:

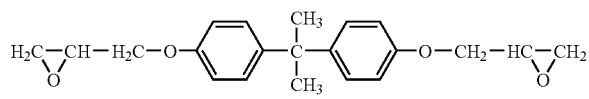

Preferably, the hydrolytic condensation catalyst is hydrolyzed into one of an acid and an alkali in the solvent. Preferably, the hydrolytic condensation catalyst is a boron trifluoride amine complex, such as boron trifluoride monoethylamine complex ($BF_3$-MEA), boron trifluoride aniline complex, boron trifluoride benzyl amine complex, boron trifluoride dimethylaniline complex, and boron trifluoride ethylaniline complex. In the preferred embodiment, the hydrolytic condensation catalyst is $BF_3$-MEA. Preferably, the amount of the hydrolytic condensation catalyst is 0.5 to 10 parts by weight based on 100 parts by weight of the epoxy resin. More preferably, the amount of the hydrolytic condensation catalyst is 1 to 5 parts by weight based on 100 parts by weight of the epoxy resin.

Preferably, the solvent is an organic solvent containing a small amount of water. The organic solvent is preferably selected from the group consisting of alcohols, benzenes, ketones, ethers, esters, and combinations thereof. More preferably, the organic solvent is selected from the group consisting of isobutanol, xylene, propylene glycol methyl ether, and combinations thereof. Preferably, the amount of the solvent is 160 to 1700 parts by weight based on 100 parts by weight of the epoxy resin.

In the preferred embodiment, the coating composition further comprises a ring-opening catalyst for catalyzing ring-opening reaction of the epoxy group on the epoxy resin. Preferably, the ring-opening catalyst is a tertiary amine. More preferably, the ring-opening catalyst is triethylamine.

Preferably, the hydrolytic condensation coating composition of this invention further comprises a fluoro-type facial surfactant. Preferably, the fluoro-type facial surfactant is fluoro aliphatic polyester. In the preferred embodiment, the fluoro-type facial surfactant is in an amount of 0.01 to 20 parts by weight based on 100 parts by weight of the epoxy resin.

According to another aspect of the invention, a method for preparing a hard coat film comprises the steps of:

(i) coating a transparent plastic substrate with the hydrolytic condensation coating composition of this invention so as to form a coating layer with a thickness of 1~20 μm; then (ii) thermo-curing the coating layer by heating the coating layer to cause the silane to hydrolyze and condense, and drying the coating layer to form the hard coat film.

Preferably, the coating layer is heated to a temperature in the range of from 80° C. to 180° C.

In the preferred embodiment, the plastic substrate is selected from the group consisting of polyester, polyolefin, polyimide, polyetherimide, polyamide, polysulfone, polyether ether ketone, polycarbonate, polyurethane, diacetylcellulose, triacetylcellulose, acrylic resin, nylon, polyether sulfone, metallocene catalyzed cycloolefin copolymer, and combinations thereof. Preferably, the plastic substrate is selected from the group consisting of polyethylene terephthalate (PET), polybutylene terephthalate (PBT) polyethylene naphthalate (PEN), polypropylene (PP), polyether sulfone (PES), triacetylcellulose (TAC) polycarbonate (PC), PMMA, Arton, Zeonor, and combinations thereof.

According to yet another aspect of the invention, hard coat film is produced by the steps of:

(i) coating a plastic substrate with a coating composition which includes an epoxy resin, silane, and a hydrolytic condensation catalyst; and (ii) heating the coating composition to cause the silane to hydrolyze and condense to form the hard coat film with a three-dimensional stereo-network structure.

Preferably, the film has a thickness in the range of 5 to 10 μm, a light transmittance greater than 90%, and a hardness greater than 2 H.

Although conventional silane-based coating compositions undergo hydrolytic condensation under curing conditions and form a coat film with a three-dimensional stereo-network structure, the coat film formed as such lacks toughness (poor flex-resistance and processability) and has insufficient hardness (bad anti-abrasion characteristics). It is found by the present inventors, after extensive research, that the epoxy-resin-based hydrolytic condensation coating composition containing silane as a coupling agent overcomes the drawback of poor toughness of the conventional silane coat film and exhibits increased hardness to impart the coat film with enhanced machanical properties. This is because the epoxy group of the epoxy resin reacts with the substituent on the silane so as to form a ring-opening bond. For example, when the substituent on the silane is an amino-substituted alkyl, the epoxy group will be bonded to the nitrogen on the amino group.

In addition, with the use of the epoxy resin and silane as the main components of the hydrolytic condensation coating composition of the present invention, the cost of raw material is significantly reduced to about one-third of the conventional UV hard resin. Moreover, the epoxy resin in the hydrolytic condensation coating composition of the present invention reacts with the silane first to provide the required mechanical properties to the final hard coat film, such as toughness, processability, and wear-resistance. After applying the hydrolytic condensation coating composition to a transparent plastic substrate, the hydrolytic condensation coating composition is treated with conventional thermo-curing process so as to undergo a sol-gel reaction. As such, expensive radiation curing equipment is not necessary.

Furthermore, the silane in the hydrolytic condensation coating composition of the present invention, after reacting with the epoxy resin, starts a hydrolytic condensation reaction with water contained in the solvent in the presence of a hydrolytic condensation catalyst to form a three-dimensional stereo-network structure. The coat film thus produced has high transparency and high hardness, and has optical and mechanical properties, which satisfy the requirements in the industry.

DETAILED DESCRIPTION OF THE PREFERRED EMBODIMENTS

The present invention provides a hydrolytic condensation coating composition comprising a silane, an epoxy resin, a hydrolytic condensation catalyst, and a suitable amount of a solvent. The weight ratio of the epoxy resin to silane is 1:0.4~6. The silane is reactable with the epoxy resin, and is hydrolyzable in the presence of the hydrolytic condensation catalyst during the process of thermo-curing to form a three-dimensional stereo-network structure.

The present invention further provides a hard coat film with high transparency and high hardness, and a method for preparing the hard coat film. The hard coat film is obtained by coating a transparent plastic substrate with the epoxy-resin based hydrolytic condensation coating composition that contains silane as a coupling agent, and heating the coating composition to cause the silane to hydrolyze and condense under high temperature so as to form the hard coat film with a three-dimensional stereo-network structure and with a thickness in the range of 1 to 20 μm.

The hard coat film is prepared by the following steps:

(i) coating a transparent plastic substrate with the epoxy-resin-based hydrolytic condensation coating composition which contains silane as a coupling agent, a small amount of hydrolytic condensation catalyst, and a suitable amount of solvent, thus forming a coat film with a thickness in the range of 1~20 μm; and (ii) heating the coat film for thermo-curing the same, and drying the coat film.

A hard coat film with high transparency and high hardness is obtained accordingly.

The hard coat film of the present invention has a thickness preferably in the range of 5 to 10 μm, a light transmittance greater than 90%, and a hardness greater than 2 H.

In the hydrolytic condensation coating composition of the present invention, the epoxy resin and the silane react first to form a bond that imparts the coat film with the required mechanical properties. The silane then reacts with a small amount of water contained in the solvent, and undergoes a sol-gel reaction represented by the following formula in the presence of the hydrolytic condensation catalyst. In the sol-gel reaction, the silane is hydrolyzed first to form a silicon alcohol, which is then condensated to form a polymer with a three-dimensional stereo-network structure. The reaction is represented by the following formulas:

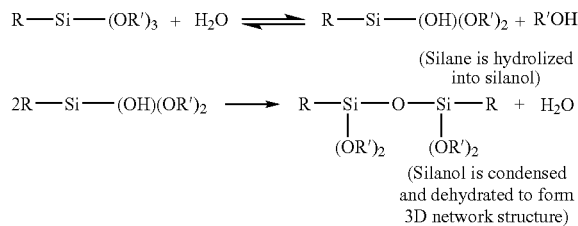

The silane suitable for use in the present invention is represented by the following formula (I):

$$Si(R_1)_1(R_2)_x(OR_3)_y \quad (I)$$

wherein x is an integer ranging from 0~2, y is an integer ranging from 1~3, and x+y=3;

wherein $R_1$ is selected from the group consisting of $C_1$~$C_4$ alkyl groups substituted by an amino group, a hydroxyl group, a carboxyl group or a halide, and an epoxide group;

wherein each $R_2$ is independently selected from the group consisting of $C_1$~$C_4$ alkyl groups substituted by an amino group, a hydroxyl group, a carboxyl group or a halide, and non-substituted $C_1$~$C_4$ alkyl groups; and wherein each $R_3$ is independently selected from the group consisting of $C_1$~$C_4$ alkyl groups.

In a preferred embodiment of the present invention, $R_1$ is N-aminoethyl-aminopropyl group ($—(CH_2)_3NH(CH_2)_2NH_2$), $R_3$ is methyl group, x is 0, and y is 3.

In another preferred embodiment of the present invention, $R_1$ is aminopropyl group (($—CH_2)_3NH_2$), $R_3$ is ethyl group ($C_2H_5$), x is 0, and y is 3.

In the present invention, the weight ratio of the epoxy resin to the silane is preferably 1:0.75~2.5. A higher content of the silane will reduce the flexibility of the resulting coat film due to the properties of inorganic material contained therein. On the other hand, when the content of the epoxy resin is too high, the stability of the hydrolytic condensation coating composition is reduced.

The epoxy resin suitable for use in the present invention is a thermosetting resin with a terminal epoxy group. In a preferred embodiment, the epoxy resin is represented by the following formula and is available from ChangChun Plastics Co., Ltd. under the trade name "BE-188":

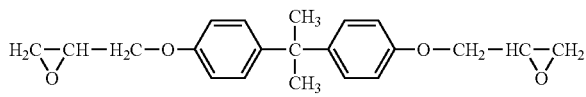

The hydrolytic condensation catalyst suitable for use in the present invention is a catalyst that can be hydrolyzed into one of an acid and an alkali. Preferably, the hydrolytic condensation catalyst is a boron trifluoride amine complex, such as boron trifluoride monoethylamine complex ($BF_3$-MEA), boron trifluoride aniline complex, boron trifluoride benzyl amine complex, boron trifluoride dimethylaniline complex, and boron trifluoride ethylaniline complex. In the preferred embodiment, the hydrolytic condensation catalyst is $BF_3$-MEA. The amount of the hydrolytic condensation catalyst is preferably 0.5 to 10 parts by weight, and more preferably 1 to 5 parts by weight, based on 100 parts by weight of the epoxy resin.

Preferably, the hydrolytic condensation coating composition of the present invention further comprises a ring-opening catalyst, which catalyzes the reaction for opening the epoxy ring on the epoxy resin. The ring-opening catalyst suitable for use in the present invention includes tert-amino compound as a catalytic curing agent, such as triethylamine (TEA), benzyl dimethylamine (BDA), dimethylaminomethyl phenol (DMAMP), and tris (dimethyl-aminomethyl) phenol (TDMAMP). In a preferred embodiment of the present invention, the ring-opening catalyst is triethylamine. The amount of the ring-opening catalyst can be adjusted according to the conditions of use.

Preferably, the hydrolytic condensation coating composition of the present invention further comprises a curing agent, which may be selected from a primary amine or a secondary amine. A curing agent suitable for use in the present invention is Isophoronediamine (IPDA) (3-aminomethyl-3,5,5-trimethylcyclohexylamine). The amount of the curing agent is 10~40 parts by weight based on 100 parts by weight of the epoxy resin.

In addition, the solvent suitable for use in the present invention is an orgainc solvent containing trace amount of water. Suitable examples include organic solvents, such as alcohols, benzenes, ketones, ethers, esters, and combinations thereof. Preferable examples are isobutyl alcohol (IBA), xylene, propylene glycol monomethyl ether (PM), and combinations thereof. The amount of the solvent is adjusted according to the conditions of use. Preferably, the amount of the solvent is 160 to 1700 parts by weight based on 100 parts by weight of the epoxy resin.

During the thermo-curing process of the silane content of the hydrolytic condensation coating composition of the present invention, the hydrolytic condensation reaction is initially activated by the trace amount of water contained in the solvent and in the catalyst. However, once the reaction starts, water produced during condensation of the silanol can be supplied for use in the hydrolysis of the silane.

Other additives, such as facial surfactants, may be added into the hydrolytic condensation coating composition of the present invention in accordance with the required physical properties of the desired product.

The facial surfactants suitable for use in the present invention include fluoro-type facial surfactant, such as fluoroaliphatic polymeric ester. In a preferred embodiment of the present invention, the facial surfactant is commercially available from 3M Co. under the trade name of FC-430. In addition, two other products FC-4430 and FC-4432 available from the same company are also suitable for use as the facial surfactant in the present invention. The amount of the facial surfactant is adjusted according to the conditions of use, and is preferably 0.04 to 20 parts by weight based on 100 parts by weight of the epoxy resin.

The hydrolytic condensation coating composition of the present invention can be stored for a long period of time, preferably in a glass container.

In the method for preparing a hard coat film with high transparency and high hardness according to the present invention, the heating temperature is preferably in the range of from 80° C. to 180° C. The heating time is preferably 10~30 minutes.

The plastic substrate suitable for use in the present invention is not particularly limited, and may be selected from an unstretched sheet or a mono-axial or di-axial stretched sheet of the following polymers: polyester, polyolefin, polyimide (PI), polyetherimide (PEI), polyamide (PA), polysulfone (PSF), polyether ether ketone (PEEK), polycarbonate (PC), polyurethane (PU), diacetylcellulose, triacetylcellulose (TAC), acrylic resin, nylon, polyether sulfone (PES), metallocene catalyzed cycloolefin copolymer, and combinations thereof. A plastic sheet produced from polyethylene terephthalate (PET), polybutylene terephthalate (PBT), polyethylene naphthalate (PEN), polypropylene (PP), PES, TAC, PC, PMMA, Arton (available from JSR Inc.), Zeonor (available from Nippon Zeon Inc.), or combinations thereof, is preferred. Chemical structures of the PC, PMMA, Arton, Zeonor are represented by the following formulas:

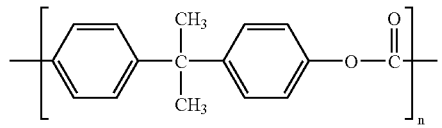

PC

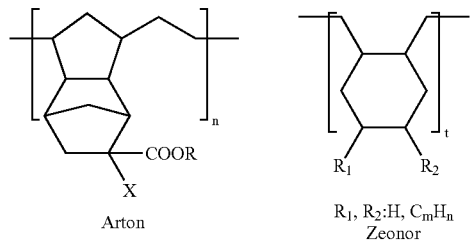

Arton     Zeonor
                $R_1, R_2: H, C_mH_n$

-continued

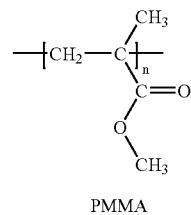

PMMA

In the method for preparing the hard coat film of the present invention, the hydrolytic condensation coating composition containing the epoxy resin and the silane is applied to the plastic substrate by means of the conventional methods of roll coating, blade coating, gravure coating, dip coating, slot die coating, etc.

The hard coat film produced in the present invention exhibits excellent anti-scratch, wear-resistant, and chemical-resistant properties, and can be widely used as a surface protective film for displays, polarizers, touch panels, ITO conductive films, other optical elements, and the like.

EXAMPLES

The present invention will be described in greater detail with reference to the following examples. However, the scope of the present invention should not be limited to the illustrative examples.

Test Methods and Standards for Physical Properties

The physical properties of the hard coat film produced in the examples were evaluated in accordance with the following methods:

(1) Thickness:

The thickness of the hard coat film was measured using the Digimatic Micrometer produced by Mitutoyo Inc. The specimen was brought into place and was tested for its thickness by adjusting a fine tuning button and a rough tuning button on the Micrometer. The Micrometer can be used for measuring in the μm scale.

(2) Luminous Transmittance:

The light transmittance of the hard coat film was measured in accordance with ASTM-D1003, using the Varian Cary 100 Spectrophotometer. The scan wavelength is in the range of from 300~900 nm. The transparency through a 550 nm specimen was taken for comparison, in a unit of %. The hard coat film specimen under test was in a size of 8 cm×8 cm.

(3) Pencil Hardness:

The pencil hardness was measured in accordance with ASTM-D3363, using the Braive instrument in the following procedure: placing the instrument flat on the specimen; removing wood from the tip of a pencil using a sharpening blade to expose 3~5 mm lead from the wood; rubbing the lead against an abrasive paper to obtain a flat cross-section; inserting the pencil into the instrument to contact the lead with the specimen, and holding the pencil firmly; moving the instrument forward for 1~2 cm, followed by pushing the instrument away; and removing the lead drawn on the specimen using an eraser. When conducting the test, the pencil with a certain hardness (H) is held at a 45° angle with respect to the hard coat film specimen under test, and is exerted with 1 kg force to scratch the specimen. The surface of the specimen is then inspected to determine the hardness. At least three scratches on different positions are taken for obtaining an average value.

(4) Adhesion:

Adhesion of the hard coat film to the substrate was tested according to ASTM-D3359. A flat specimen of the plastic substrate coated with the hard coat film was cut into 100 squares using a Braive cutter. Then, a 3M#600 tape was adhered to the squares. If all 100 squares were not removed from the substrate, the adhesion of the coat film to the substrate was determined to be 5 B (excellent). If more then 65 squares were removed from the substrate with the tape, the adhesion of the coat film to the substrate was determined to be 0 B(poor).

(5) Chemical Resistance (Solvent Resistance):

The hard coat film was dipped into an aqueous solution containing 5% NaOH and 5% HCl at 40° C. for 3 minutes. The appearance of the hard coat film was then inspected to see if peel-off or haze was found in the film.

Plastic Substrate

The plastic substrate used in the following examples is commercially available from Teijin Inc. under the trade name of OLPFW, and is a PET film with a thickness of 0.188 mm.

Components of the Hydrolytic Condensation Coating Composition (i) silane: commercially available from Dow Corning Inc., under the trade name of Z-6020 (with the formula $NH_2(CH_2)_2NH(CH_2)_3Si(OCH_3)_3$), Z-6011 (with the formula $NH_2(CH_2)_3Si(OC_2H_5)_3Si(OCH_3)_3$), and Z-6040 (3-glycidoxypropyltrimethoxysilane).

(ii) epoxy resin: commercially available from ChangChun Plastics, Co. Ltd., under the tradename of BE-188.

(iii) Hydrolytic condensation catalyst: $BF_3$-MEA, commercially available from Hashimoto Chemicals Inc.

(iv) Ring-opening catalyst: TEA, commercially available from Tedia Inc., under the trade name of TR-1867, with a moisture content of 0.05%

(v) Solvent: (1) IBA: commercially available from Tedia Inc. under the trade name of BS-1231, with a moisture content of 0.01%; (2) Xylene: commercially available from Tedia Inc. under the trade name of XR-2250, with a moisture content of 0.005%; (3) propylene glycol monomethyl ether (PM): commercially available from Tedia Inc. under the trade name of PR-1493 surfactant, and from 3M Inc. under the trade name of FC-430.

(vi) Curing agent: Isophoronediamine (IPDA), available from Acros.

Example 1

100 parts by weight of epoxy resin (BE-188), 165 parts by weight of silane (Z-6020), 4 parts by weight of TEA, 292 parts by weight of IBA, 116 parts by weight of xylene, and 116 parts by weight of PM were added into a reaction tank and were stirred using an electric stirrer for 3 hours under 25° C. Then, 5.6 parts by weight of $BF_3$-MEA and 0.8 parts by weight of FC-430 were added in sequence. Stirring continued for 1.5 hours to form the hydrolytic condensation coating composition. The hydrolytic condensation coating composition was then applied to a PET plastic substrate by means of blade coating method. The plastic substrate and the hydrolytic condensation coating composition applied thereto were brought into an oven and heated at 150° C. to undergo a thermo-curing process. The hydrolytic condensation coating composition was dried to form the hard coat film. Physical properties of the hard coat film were evaluated according to the test methods described above. The results are shown in Table 1.

Example 2

A hard coat film was obtained in the same manner as Example 1 except that the silane was Z-6011. The results of evaluation of the physical properties of the prepared hard coat film are shown in Table 1.

Example 3

A hard coat film was obtained in the same manner as Example 1 except that the amount of the components are changed, as shown in Table 1. The results of evaluation of the physical properties of the prepared hard coat film are also shown in Table 1.

Example 4

A hard coat film was obtained in the same manner as Example 2 except that the amount of the components are changed, as shown in Table 1. The results of evaluation of the physical properties of the prepared hard coat film are also shown in Table 1.

Example 5

A hard coat film was obtained in the same manner as Example 1 except that the silane was Z-6040 and that the reaction tank was further added with 35 parts by weight of IPDA. The results of evaluation of the physical properties of the prepared hard coat film are also shown in Table 1.

TABLE 1

| | | Example 1 | Example 2 | Example 3 | Example 4 | Example 5 |
|---|---|---|---|---|---|---|
| Weight parts of components of the coating composition | Epoxy resin | 100 | 100 | 100 | 100 | 100 |
| | Silane | 165 | 165 | 115 | 115 | 165 |
| | | (Z-6020) | (Z-6011) | (Z-6020) | (Z-6011) | (Z-6040) |
| | Solvent  IBA | 292 | 292 | 235 | 235 | 292 |
| | Xylene | 116 | 116 | 93 | 93 | 116 |
| | PM | 116 | 116 | 93 | 93 | 116 |
| | Facial surfactant (FC-430) | 0.8 | 0.8 | 0.6 | 0.6 | 0 8 |
| | Ring-opening | 4 | 4 | 3.2 | 3.2 | 4 |

TABLE 1-continued

|  |  | Example 1 | Example 2 | Example 3 | Example 4 | Example 5 |
|---|---|---|---|---|---|---|
|  | catalyst (TEA) Hydrolytic condensation catalyst (BF$_3$-MEA) | 5.6 | 5.6 | 4.5 | 4.5 | 5.6 |
|  | Curing agent (IPDA) | 0 | 0 | 0 | 0 | 35 |
| Physical properties of the coating composition | Thickness of the hard coat film (μm) | 5.0 | 5.0 | 5.0 | 5.0 | 5.0 |
|  | Light transmittance (%; 550 nm) | 90.8 | 90.7 | 91.2 | 91.5 | 91.3 |
|  | Pencil hardness (H) | 3 | 2~3 | 2~3 | 2 | 3 |
|  | Adhesion (B) | 5 | 5 | 5 | 5 | 5 |
|  | Chemical Resistance | Good | Good | Good | Good | Good |

It is apparent from Table 1 that each of the hard coat films prepared in the Examples has a high transparency greater than 90%, a pencil hardness greater than 2 H, and an excellent adhesion (5 B) to the transparent plastic substrate. The hard coat films prepared in Examples 1~5 have excellent chemical resistance (anti-solvent) property. The hard coat film of the present invention can thus be used widely in applications that require the aforementioned properties, such as a surface protective film for a display, a polarizer, a touch panel, an ITO conductive film, and other optical elements.

It has been shown that, with the use of lower cost silane and epoxy resin as main components to form the hydrolytic condensation coating composition, and the use of a relatively inexpensive thermo-curing device, a high-transparency and high-hardness hard coat film with both inorganic material property and organic material property (good toughness) can be prepared. In comparison with the conventional hard coat film cured by radiation curing techniques, the hard coat film prepared in the present invention is significantly reduced in both material and equipment costs and is thus more suitable for mass production. Moreover, the hard coat film of the present invention has higher hardness and toughness relative to the conventional silane-type inorganic hard coat film, and thus has excellent product properties.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A hydrolytic condensation coating composition comprising a silane, an epoxy resin, a hydrolytic condensation catalyst, a solvent, and a curing agent selected from the group consisting of primary and secondary amines, wherein the weight ratio of the epoxy resin to the silane is 1:0.4~6, the silane being reactable with the epoxy resin and being hydrolyzable in the presence of the hydrolytic condensation catalyst to form a three-dimensional stereo-network structure; the amount of the curing agent is 10~40 parts by weight based on 100 parts by weight of the epoxy resin and the hydrolytic condensation catalyst is hydrolyzed into one of an acid and an alkali in the solvent.

2. The hydrolytic condensation coating composition as claimed in claim 1, wherein the hydrolytic condensation catalyst is a boron trifluoride amine complex.

3. The hydrolytic condensation coating composition as claimed in claim 2, wherein the hydrolytic condensation catalyst is selected from the group consisting of boron trifluoride monoethylamine complex (BF$_3$-MEA), boron trifluoride aniline complex, boron trifluoride benzyl amine complex, boron trifluoride dimethylaniline complex, and boron trifluoride ethylaniline complex.

4. The hydrolytic condensation coating composition as claimed in claim 2, wherein the hydrolytic condensation catalyst is BF$_3$-MEA.

5. A hydrolytic condensation coating composition comprising a silane, an epoxy resin, a hydrolytic condensation catalyst, a solvent, and a curing agent selected from the group consisting of primary and secondary amines, wherein the weight ratio of the epoxy resin to the silane is 1:0.4~6, the silane being reactable with the epoxy resin and being hydrolyzable in the presence of the hydrolytic condensation catalyst to form a three-dimensional stereo-network structure and the amount of the curing agent is 10~40 parts by weight based on 100 parts by weight of the epoxy resin; and further comprising a ring-opening catalyst for catalyzing ring-opening reaction of the epoxy group on the epoxy resin.

6. The hydrolytic condensation coating composition as claimed in claim 5, wherein the ring-opening catalyst is a tertiary amine.

7. The hydrolytic condensation coating composition as claimed in claim 6, wherein the ring-opening catalyst is triethylamine.

8. A hydrolytic condensation coating composition comprising a silane, an epoxy resin, a hydrolytic condensation catalyst, a solvent, and a curing agent selected from the group consisting of primary and secondary amines, wherein the weight ratio of the epoxy resin to the silane is 1:0.4~6, the silane being readable with the epoxy resin and being hydrolyzable in the presence of the hydrolytic condensation catalyst to form a three-dimensional stereo-network structure, the amount of the curing agent is 10~40 parts by weight based an 100 parts by weight of the epoxy resin; and the curing agent is isophoronediamine (PDA).

* * * * *